United States Patent
Berry

(10) Patent No.: US 8,479,523 B2
(45) Date of Patent: Jul. 9, 2013

(54) METHOD FOR GAS TURBINE OPERATION DURING UNDER-FREQUENCY OPERATION THROUGH USE OF AIR EXTRACTION

(75) Inventor: Jacob Berry, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 2006 days.

(21) Appl. No.: 11/442,007

(22) Filed: May 26, 2006

(65) Prior Publication Data

US 2007/0271929 A1    Nov. 29, 2007

(51) Int. Cl.
*F02C 6/08*  (2006.01)

(52) U.S. Cl.
USPC ............................................ 60/782

(58) Field of Classification Search
USPC ............... 60/773, 782, 785, 795, 39.281
See application file for complete search history.

(56) References Cited

U.S. PATENT DOCUMENTS

| | | | |
|---|---|---|---|
| 4,380,893 A | | 4/1983 | Stokes et al. |
| 5,301,500 A | * | 4/1994 | Hines ............................ 60/792 |
| 5,555,721 A | * | 9/1996 | Bourneuf et al. ............... 60/806 |
| 6,226,974 B1 | | 5/2001 | Andrew et al. .............. 60/39.02 |
| 6,442,942 B1 | * | 9/2002 | Kopko ............................. 60/773 |
| 6,718,771 B1 | * | 4/2004 | Kopko ............................. 60/773 |
| 6,794,766 B2 | | 9/2004 | Wickert et al. .................. 290/52 |
| 7,124,591 B2 | * | 10/2006 | Baer et al. ....................... 60/786 |
| 7,169,030 B1 | | 1/2007 | Kulp |
| 2003/0046938 A1 | * | 3/2003 | Mortzheim et al. ............ 60/782 |
| 2004/0131984 A1 | * | 7/2004 | Satek et al. ......................... 431/4 |
| 2004/0191596 A1 | * | 9/2004 | Bowman et al. ................. 429/26 |
| 2005/0103021 A1 | * | 5/2005 | Held et al. ....................... 60/776 |
| 2007/0089395 A1 | * | 4/2007 | Fujii et al. .................. 60/39.281 |

OTHER PUBLICATIONS

State Intellectual Property Office, P.R. China First Office Action, Aug. 11, 2010.

* cited by examiner

*Primary Examiner* — Phutthiwat Wongwian
(74) *Attorney, Agent, or Firm* — Ernest G. Cusick; Frank A. Landgraff

(57) ABSTRACT

In a gas turbine electric power generator where rotational speed of the gas turbine is synchronized to the electrical frequency of a power distribution grid and the gas turbine includes a compressor component, an air extraction path, and a control system for controlling an amount of compressor air extraction, a method is provided for controlling output power produced by a gas turbine. The method includes initiating compressor air extraction and controlling the amount of compressor air extraction.

13 Claims, 2 Drawing Sheets

METHOD FOR GAS TURBINE OPERATION DURING UNDER-FREQUENCY OPERATION THROUGH USE OF AIR EXTRACTION

BACKGROUND OF THE INVENTION

The invention relates generally to a method for operating a gas turbine during select operating conditions such as under-frequency operation through extraction of air from the compressor.

Large increases in the electrical power consumptive demand placed upon an electrical power distribution grid will tend to reduce the electrical operational frequency of the grid, causing an "under-frequency" event. For example, a heavy or sudden electrical demand may cause a particular power distribution grid having a nominal operational frequency of 50 Hz to momentarily operate at 49 Hz. In conventional electrical power generation systems that utilize one or more heavy-duty industrial gas turbine for supplying electrical power to the grid, the physical speed of each turbine supplying power to the grid is synchronized to the electrical frequency of the grid. Unfortunately, as the physical speed of a gas turbine decreases with other things being equal, its power output correspondingly decreases. Consequently, during an under-frequency event, a gas turbine will tend to output a lower power. In the past, a common practice in response to a power grid under-frequency event (occurrence) is to increase the firing temperature of the gas turbine to produce more power in an effort to maintain a predetermined level of output power. Unfortunately, such over-firing of the gas turbine may reduce the operational life expectancy of various hot gas path components within the turbine.

Grid code regulations typically require that power production equipment have the capability to maintain load during under-frequency excursions. Various regions around the world have different requirements that must be satisfied in order for power equipment to be considered compliant. Typically, gas turbine generators meet these requirements by increasing firing temperature to maintain generator output within requirements. Increases in firing temperature increase power output at a given pressure ratio, which works adequately when the gas turbine does not approach any operating limits such as maximum pressure ratio capability or maximum inlet guide vane (IGV) position. A firing temperature increase is typically achieved by an increase the fuel flow supplied to the combustor. All things otherwise equal, the increase in fuel flow results in a higher pressure at the turbine inlet, which in turn applies backpressure on the compressor. Eventually, adding more flow results in a compressor pressure limit, which typically is observed by limiting the flow through the turbine through the diversion of compressor discharge air to inlet (inlet bleed heating) and/or reduction of fuel flow (and consequently firing temperature). However, this method has limited capability to meet grid code requirements for cool ambient conditions and/or low Btu fuels (e.g. syngas) applications, due to operability limits encountered by the gas turbine compressor.

Some conventional gas turbines, used for power generation, incorporate variable inlet guide vanes (IGV). Such variable stator vanes provide the ability to adjust compressor airflow by changing incidence angle (i.e., the difference between the air angle and the mean line angle at the compressor blade leading edge) in the front stages of the compressor. These variable IGVs permit an acceptable compressor surge-free operation margin to be maintained. Typically, maintaining surge-free operation is a vital operational criterion of the compressor component for gas turbines.

Wickert et al. (U.S. Pat. No. 6,794,766) provides a method for over-firing of gas turbines equipped with variable stator vanes (blades) to compensate for power output during under-frequency events. Wickert utilizes the variable stator vanes to increase the amount of airflow consumed by the compressor component in a predefined manner so to preclude and/or minimize a decrease in the level of output power generated during a grid under-frequency event and maintaining a safe margin during such an event. However, not all gas turbines are equipped with variable stator vanes to permit employing such a technique. Further, this action alone may not be sufficient if the maximum vane position is reached and a pressure ratio limit is encountered simultaneously while attempting to increase output. In this situation, other action must be taken to alleviate the pressure limit.

It would therefore be desirable to utilize an operational method, which would improve the power output during select operations and result in improved grid code compliance during under-frequency operation.

BRIEF DESCRIPTION OF THE INVENTION

Briefly, in accordance with one aspect of the present invention, in a gas turbine electric power generator where rotational speed of the gas turbine is synchronized to the electrical frequency of a power grid and the gas turbine includes a compressor component, an air extraction path, and means for controlling an amount of compressor air extraction, a method is provided for controlling output power produced by a gas turbine. The method includes initiating the compressor air extraction and controlling the amount of compressor air extraction.

In accordance with another aspect of the present invention, in a gas turbine electric power generator where rotational speed of the gas turbine is synchronized to the electrical frequency of a power grid and the gas turbine includes a compressor component, an air extraction path, and means for controlling an amount of compressor air extraction, a method is provided for controlling output power produced by a gas turbine. The method includes initiating compressor air extraction and controlling the amount of compressor air extraction during a power grid under-frequency condition through at least one of a discharge path to atmosphere, a discharge path to energy recovery equipment; reducing diluent flow to the combustor and raising the firing temperature.

In accordance with a further aspect of the present invention, the gas turbine electric power generator wherein a rotational speed of a gas turbine is synchronized to the electrical frequency of a power grid, a control system is provided that controls initiating compressor air extraction and controlling extracting compressor air to increase margin to compressor pressure ratio limits.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The previously described aspects of the present invention have many advantages, including using compressor air extraction to provide a simple and effective method of operating the gas turbine during under-frequency events.

Figure 1:
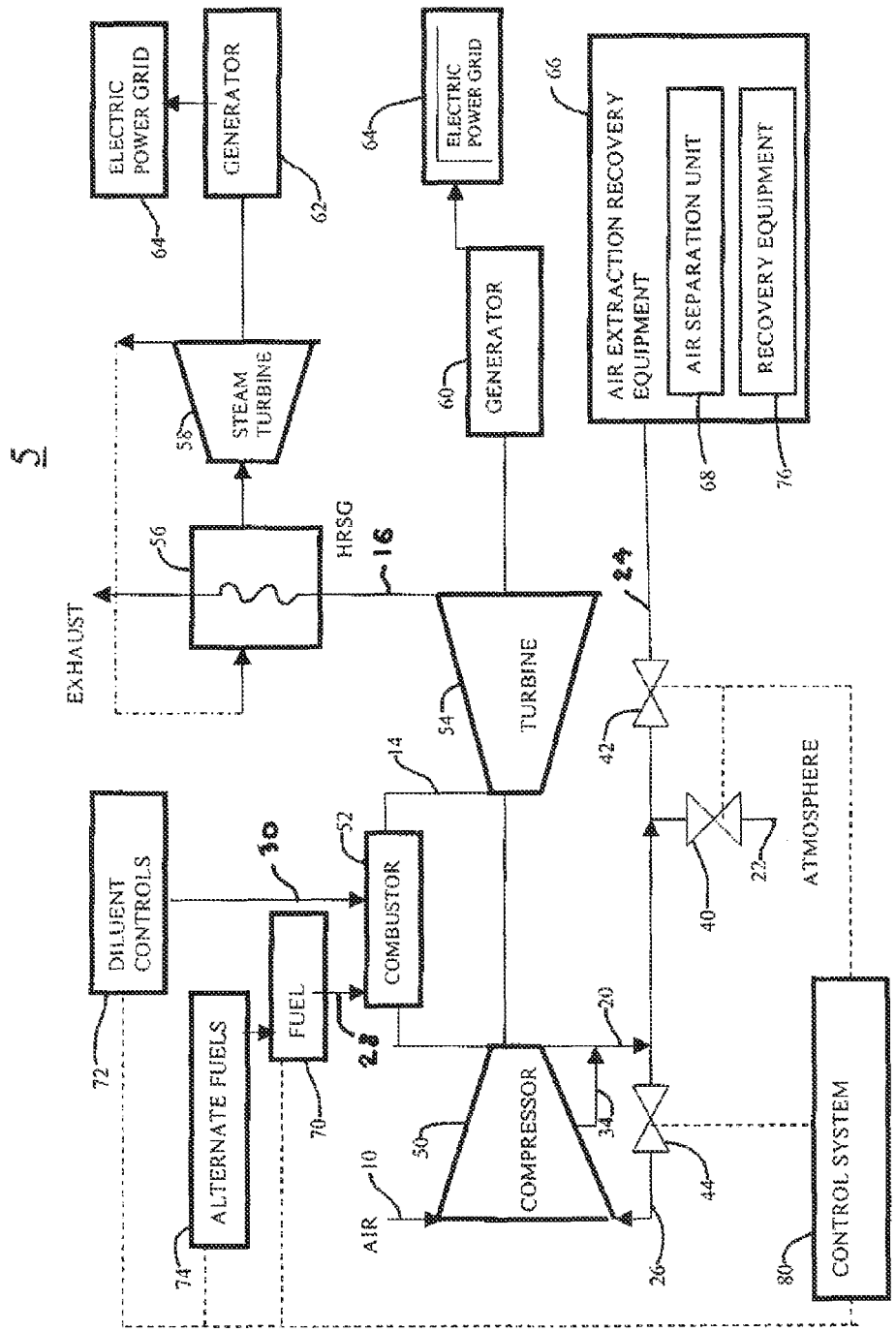
FIG. 1 illustrates a typical gas turbine generator set incorporating standard air, fuel, and combustion product flow.

FIG. 1 illustrates combined cycle gas turbine equipment 5, including a compressor 50, a combustor 52, a gas turbine 54, a heat recovery steam generator (HRSG) 56 and it associated steam turbine 58. Air, under ambient conditions, enters the axial flow compressor 50 at air intake 10. The compressed air 12 enters the combustor 52 where fuel is injected at 28 and combustion occurs. The combustion mixture 14 leaves the combustor and enters the gas turbine 54. In the turbine section, energy of the hot gases is converted into work. This conversion takes place in two steps. The hot gases are expanded and the portion of the thermo-energy is converted into kinetic energy in the nozzle section of the gas turbine 54. Then a portion of the kinetic energy is transferred to the rotating bucket of the bucket section of the gas turbine 54 and converted to work. A portion of the work developed by the gas turbine 54 is used to drive the compressor 50 whereas the remainder is available for generating electric power. The exhaust gas 16 leaves the gas turbine and flows to the HRSG 56, providing energy to produce steam for driving steam turbine 58. Electric power is generated from the gas turbine driven generator 60 and the steam turbine driven generator 62 and supplied to an electric power grid 64.

Figure 2:
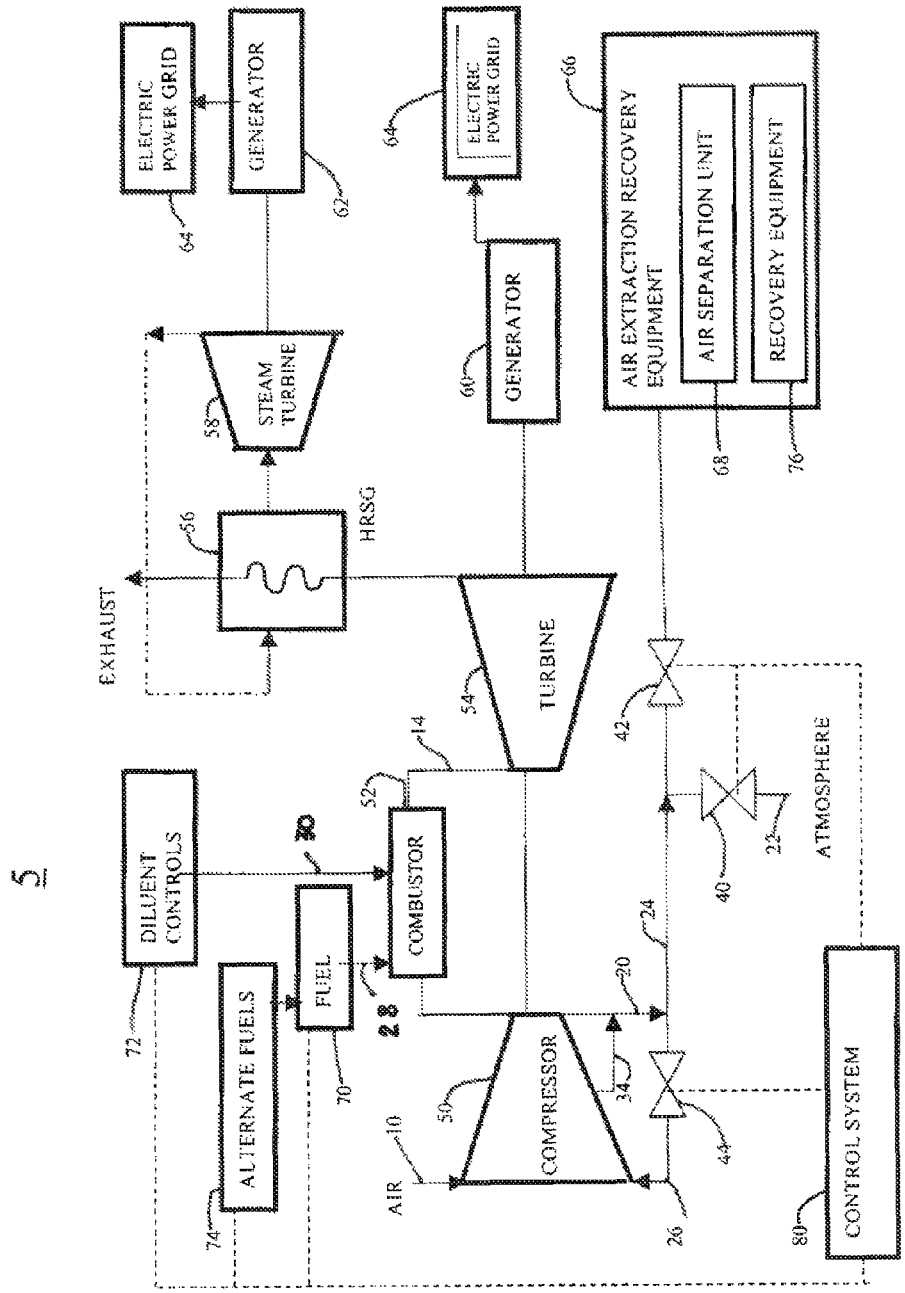
FIG. 2 illustrates a gas turbine generator set with a plurality of elements that permit gas turbine operation during under-frequency operation through use of air extraction.

The Brayton cycle is the thermodynamic cycle upon which gas turbines operate. Every Brayton cycle can be characterized by pressure ratio and firing temperature. The pressure ratio of the cycle is the compressor discharge pressure at 12 divided by the compressor inlet pressure at 10. The firing temperature is defined as the mass flow mean total temperature at the stage 1 nozzle trailing edge plane. It is well known that an elevated firing temperature in the gas turbine is a key element in providing a higher output per unit mass flow and therefore a higher output power. The maximum pressure ratio that the compressor can deliver in continuous operation is commonly defined in terms of a margin from a surge pressure ratio line. Compressor surge is defined as a low frequency oscillation of flow where the flow separates from the blades and reverses flow direction FIG. 2 shows different extraction points and discharge paths for air extraction on the combined cycle gas turbine equipment 5, which may be used alone or in combination. In one aspect of the invention, extraction air would be taken from the compressor 50 outlet and/or combustor 52 at 20 and vented to atmosphere at 22 via discharge to atmosphere control valve 40. Compressor air may be further extracted at 34 from the compressor upstream of the compressor outlet. Specific location points for extraction of air from the gas turbine depend on the particular device. For example, air extraction from the General Electric "E" Series gas turbines is typically from the outlet of the compressor while the air extraction point from the General Electric "F" Series gas turbines is typically from the combustor. In another aspect of the invention, extracted air may be discharged to air extraction energy recovery equipment 66 through discharge to energy recovery equipment control valve 42. The air extraction energy recovery equipment 66 may include an air separation unit (ASU) 68 and other recovery equipment 76. The ASU 68 separates $N_2$ and $O_2$ in the air. The $O_2$ may then be used in the production of syngas fuel for a gas turbine in a gasification process while $N_2$ may be used as a diluent or vented. Still another aspect of the invention provides extraction of compressor 50 outlet air through inlet bleed control valve 44 to the inlet side of the compressor 50 at 26.

Air extraction alone will typically result in a decrease in power output, all other factors being equal, due to decreased mass flow rate input. However, simultaneously with the air extraction, additional fuel is supplied to the combustor 52. at 28. The reduction in compressor airflow through air extraction provides relief of the compressor pressure ratio limits typically encountered. Because compressor airflow extraction provides relief of the compressor pressure ratio limits, increased fuel flow can be accommodated within the compressor pressure ratio limits. The resulting gas turbine output power is increased while maintaining margin to the compressor pressure ratio. During under-frequency conditions, employing air extraction with increased firing will increase gas turbine output power to assist in meeting grid code requirements.

Yet another aspect of the present invention reduces diluents inflow 30 to the combustor 52. Lower diluent flow to the combustor reduces the overall fuel/air flow rate. With a lower diluent flow rate, the margin to the compressor-pressure ratio limit is increased and more fuel may be added in its place to increase power.

In still a further aspect of the present invention, the combustor 52 may be co-fired with a richer alternative fuel at 32, such as natural gas or distillate or blends with the richer alternative fuels, if a primary fuel is leaner as is typical of syngas and process fuels. Because the co-firing with the richer alternative fuel permits a higher power output with the same fuel flow rate, higher output power can be achieved with a lower overall fuel/air flow rate, thereby maintaining a margin to the compressor pressure ratio limit.

Individual elements described above for permitting a higher power output from the gas turbine may be used alone or in combination.

Efficient operation of the gas turbine requires that a number of critical turbine operating parameters be processed to determine optimal settings for controllable parameters such as fuel flow and intake air flow. Such operating parameters include compressor inlet and outlet temperatures and pressures, exhaust temperature and pressure and the like. One example of a control system or means for controlling a gas turbine is the General Electric Co.'s Speedtronic™ Mark V Control System, which is designed to fulfill all gas turbine control, including speed and load control functions. Such a control system is described in Andrew et al. (U.S. Pat. No. 6,226,974). Andrew describes a controller that is coupled to receive input from a plurality of sources such as operations controls and a plurality of sensors coupled to the turbine and power output means. The controller is coupled to a system of turbine actuators that are used to maintain or establish a particular turbine operating regime. The actuators include, but are not limited to, an air flow control actuator and a fuel flow control actuator.

In an aspect of the present invention, a similar control system to Andrew et al. may be employed, with or without IGV control. The control system may also employ controls over one or a combination of control valves. Referring to FIG. 2, the control system 80 may control additional actuating controls, such as discharge to atmosphere control valve 40, discharge to energy recovery equipment control valve 42 and inlet bleed control valve 44 that extract part of the air flowing from the discharge of the compressor for improving margin to compressor pressure ratio limits, thereby allowing increased firing for power control. The control system 80 initiates the compressor air extraction and controls the amount of compressor air extraction from discharge to atmosphere control valve 40, discharge to energy recovery equipment control valve 42, and inlet bleed valve 44. Further, the control system 80 will further control fuel input to the combustor 70, diluent control 72, and alternate fuel control 74. Because such sensing and actuating controls are well known in the art, they need not be described herein with respect to actuator controls for air extraction operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling output power produced by a gas turbine by driving an electric generator connected to an electrical utility grid with a rotational speed of a gas turbine synchronized to an electrical frequency of the electrical utility grid, wherein the gas turbine includes a compressor providing air to a combustor wherein fuel is combusted providing a hot gas path to drive a turbine, an extraction path for air passing through the compressor that supplies air for the gas turbine and a control for the extraction path for the air, the method comprising:
   providing a flowpath for air within the gas turbine including through the compressor providing the air to the combustor;
   mixing the air with the fuel in the combustor;
   powering the turbine rotatingly connected to the electrical generator electrically connected to an electrical utility grid;
   initiating air extraction from the flowpath for air within the gas turbine; and
   supplying power requirements on the electrical utility grid by raising power output from the gas turbine by increasing the fuel supply to the combustor until a limit on performance of the compressor is reached while maintaining a margin to a limit on performance of the compressor at the power output of the gas turbine by controlling an amount of air extraction from the flowpath for air.

2. The method of claim 1, further comprising:
   the step of maintaining a margin to a limit on performance of the compressor including maintaining a margin to a compressor ratio limit; and
   the step of raising output power from the gas turbine including increasing a firing temperature of the gas turbine.

3. A method of controlling output power produced by a gas turbine driving an electric generator connected to an electrical utility grid with a rotational speed of the gas turbine synchronized to an electrical frequency of the electric utility grid during an underfrequency event on the electrical utility grid, wherein the gas turbine includes a compressor providing air to a combustor wherein fuel is combusted thereby providing a hot gas path to drive a turbine, an extraction path for air passing through the compressor that supplies air to the gas turbine and a control for the extraction path for the air, the method comprising:
   providing a flowpath for air within the gas turbine including through the compressor supplying the air to the combustor;
   powering the turbine rotatingly connected to an electrical generator electrically supplying the electric utility grid;
   initiating air extraction from the flowpath for air within the gas turbine;
   supplying power to the electrical utility grid at a reduced frequency during a underfrequency event on the electrical utility grid; and
   raising output power from the gas turbine by increasing the fuel supply to the combustor according to requirements of the electrical utility grid at the reduced frequency until a limit on performance of the compressor is reached while maintaining a margin to a limit on performance of the compressor at the output power from the gas turbine by controlling an amount of air extraction form the flowpath for air.

4. The method of claim 3, the step of maintaining a margin on performance of the compressor comprising: maintaining a margin to compressor ratio.

5. The method claim 4, the step of maintaining a margin to compressor ratio limits comprising: extracting air from the compressor.

6. The method of claim 4, further comprising: extracting air from the combustor.

7. The method of claim 3, further comprising: exhausting the extracted air to atmosphere.

8. The method claim 3, further comprising: exhausting the extracted air to air extraction energy recovery equipment.

9. The method of claim 3, further comprising: exhausting the extracted air from the compressor as inlet bleed to a low pressure side of the compressor.

10. The method of claim 3, further comprising: shunting the extracted air from an intermediate stage of the compressor to an outlet stage of the compressor.

11. The method of claim 3, the step of raising output power further comprising:
   reducing diluents added to the combustor; and
   raising firing temperature of the gas turbine and restoring output power.

12. The method of claim 3, the step of raising output power comprising:
   transferring a fuel input to the combustor from a fuel with a low energy content to a fuel input with a high energy content, if the fuel input initially has a low energy content.

13. The method of claim 12, further comprising: co-firing the gas turbine with one of a fuel with high energy content and a blend of fuels with a high energy, if the initial fuel has a low energy content.

* * * * *